May 20, 1958   J. E. HIGGINS ET AL   2,835,583
FOOD PELLET AND METHOD OF MANUFACTURE
Filed March 21, 1956
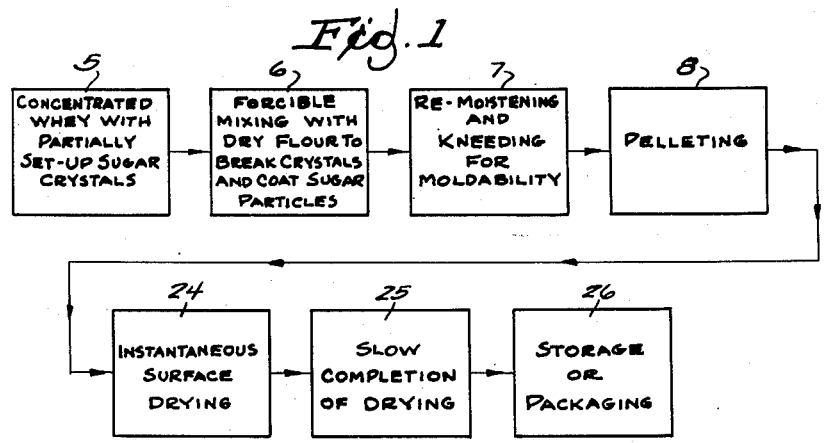
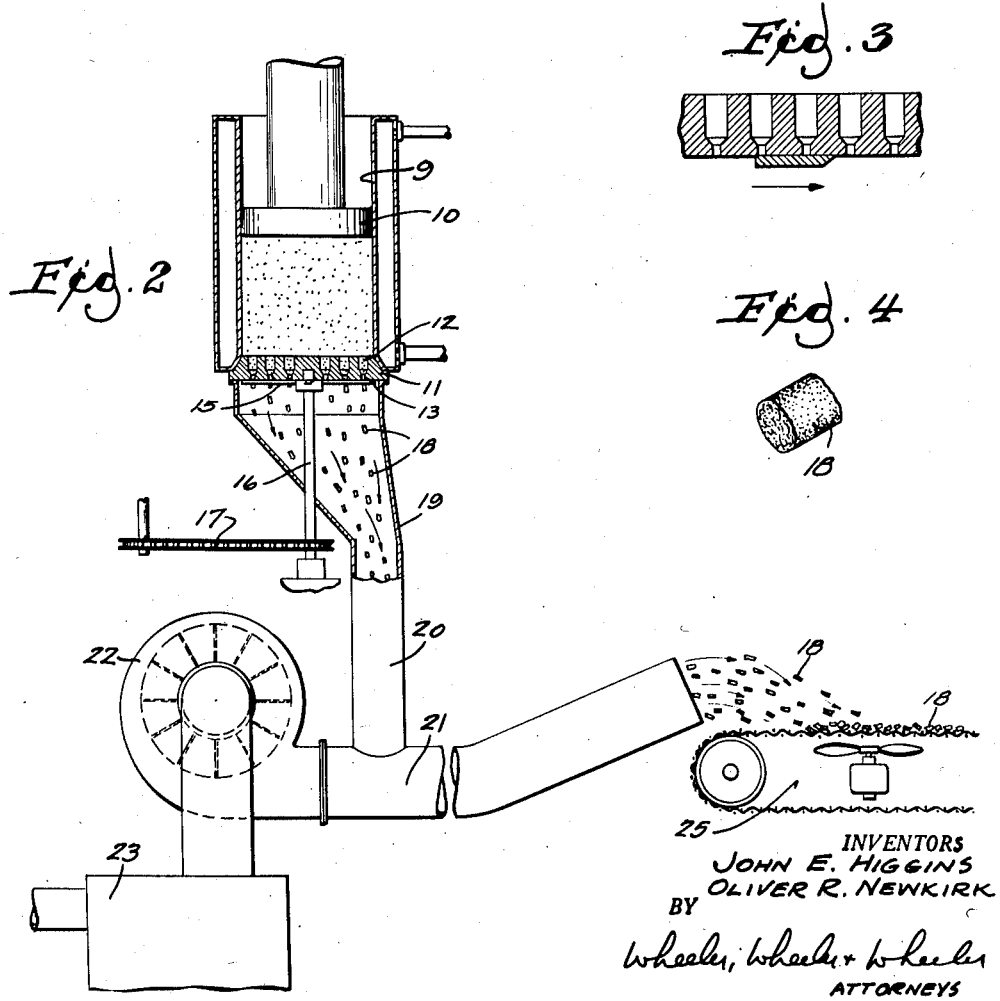
INVENTORS
JOHN E. HIGGINS
OLIVER R. NEWKIRK
BY
Wheeler, Wheeler + Wheeler
ATTORNEYS United States Patent Office 2,835,583
Patented May 20, 1958

2,835,583

FOOD PELLET AND METHOD OF MANUFACTURE

John E. Higgins and Oliver R. Newkirk, Richland Center, Wis.

Application March 21, 1956, Serial No. 572,862

7 Claims. (Cl. 99—2)

This invention relates to a food pellet and method of manufacture.

Concentrated whey provides the basis for the product. The whey is concentrated to about 72%, at which point it has putty-like consistency and its sugar content comprises partially set up crystals. Oat flour, alfalfa meal, or any other flour suitable for food, together with any desired fortifying material, is then added in quantities sufficient so that when mixed with the whey, the flour coats all sugar and renders it non-adhesive.

Unlike previous proposals to add flour to whey preliminary to pelleting, the present invention involves the addition of a sufficient amount of flour so that the resulting mixture is too dry for the pelleting process. The precise amount of flour added depends very materially upon the particular type of flour used. In the case of oat flour, we add about 50 pounds of flour to every 100 pounds of whey concentrate. The composition is then thoroughly and forcibly mixed. By conducting the mixing operation when the material is substantially dry, all sugar crystals are thoroughly broken down. This result cannot be achieved if the mixture has a consistency such as to be adapted for pelleting.

After the material has reached the desired degree of dryness and has been mixed or kneaded sufficiently to break down the sugar crystals, any desired moisture such as water or skim milk is added in an amount sufficient to permit the resulting compound to be passed through a pelleting press. Even if the doughy mixture has essentially the same consistency for pelleting purposes as if it had not previously been over-dried and then re-moistened, we find that our process substantially eliminates the stickiness which would otherwise be found.

Pelleting is desirably conducted at a temperature of 90° or over and the resulting pellets fall through free space into a pneumatic current which sustains them during the brief interval required to dry their surfaces adequately to prevent adhesion to each other or to the wall of the pipe through which they are being conveyed. As soon as the requisite degree of dryness is achieved, the pellets are discharged from the pneumatic conveyor onto screens where surplus moisture is more slowly evaporated and the pellets are left dry enough for storage.

In the drawings:

Fig. 1 is a diagram showing successive steps in the method herein disclosed.

Fig. 2 is a diagrammatic view of a pelleting press in axial section, portions of the pneumatic conveying and drying system being shown fragmentarily in side elevation.

Fig. 3 is an enlarged sectional detail view fragmentarily illustrating the die plate of the press.

Fig. 4 is a further enlarged detail view in perspective of a completed pellet.

The whey which constitutes the basic material is concentrated to about 72% solids, at which point its sugar content is at least partially set up as crystals. This step is represented by block 5 in the diagram, Fig. 1.

Thereupon the whey concentrate is mixed with dry flour such as oat flour or alfalfa meal flour or any other edible flour of sufficient fineness and in sufficient proportions of flour to coat all of the sugar crystals of the whey. In practice, I use approximately 50 pounds of flour to approximately 100 pounds of whey. These proportions are not critical but the resulting mixture, when thoroughly and forcibly kneaded or mixed, will necessarily be too dry for pelleting. Only if the mixture has this degree of dryness will the forcible mixing result in thoroughly breaking down the sugar crystals without sticking of the material to the parts of the mixer. This forcible mixing of the concentrated whey with dry materials to break the crystals is represented by the second block 6 of the diagram in Fig. 1.

In order to form the material into pellets, it is now necessary to add moisture since, as aforesaid, in order to mix the material and break down the sugar crystals without stickiness, it is necessary to have the material too dry for pelleting. The moisture may be added in any desired form, examples being ordinary water, milk or skim milk. Again, the proportions are not critical. In actual practice, we have added two quarts to a gallon of moisture to the assumed proportions of 100 pounds of whey concentrate and 50 pounds of flour.

The amount added will be any amount which leaves the moisture sufficiently doughy to permit pelleting. This operation is represented by block 7 in the diagram, Fig. 1. It may be noted that the water content of the mixture at the time of pelleting is such that the mixture would have been extremely sticky if it had not been for the previous step of forcible mixing with an excess of dry flour to break down the sugar crystals.

The next step is the pelleting operation indicated in block 8 of the diagram, Fig. 1. This is desirably done at a temperature of 90° to 100° F. in a pelleting press which comprises a pocketed cylinder 9, piston 10 and extrusion die 11. The extrusion die may be of substantial thickness as shown in Fig. 3, having holes 12 of relatively large bore communicating with the relatively small orifices 13 through which the material is extruded. The material issues in rods which, in practice, approximate three thirty-seconds of an inch in diameter.

Operating immediately below the face of the die 11 is a rotary shear 15 mounted on shaft 16 and driven by chain 17 from any appropriate source of power. This cuts the extruded rods into pellets 18 which fall through the hopper 19 and pipe 20 to enter pipe 21 through which a powerful blast of air is maintained by the blower 22. The air is desirably derived from a heater 23 at temperatures not to exceed 160° F. Even without heating, the air blast is capable of exerting a very substantial drying effect whereby the surfaces of the pellets 18 are immediately dried during pneumatic convection through pipe 21 to an extent sufficient so that the pellets do not stick together when discharged from the pneumatic conveyor system. This surface drying step is represented by block 24 in the diagram, Fig. 1.

If any attempt were made to proceed rapidly with the drying of the pellets, these would become "case hardened." That is to say, the surface would become so dry as to make it difficult to dehydrate the interior portions of the pellets. Consequently, the rapid drying operation is confined to the surface only and is limited to dehydration which is only sufficient to keep the pellets from sticking to each other when discharged. Thereupon, the drying operation proceeds more slowly, as is indicated at 25. In practice, the pellets discharged from the pneumatic conveyor are placed on a tray or conveyor apron 25 through which air can circulate to continue the dehydration until the pellets can safely be stored. They are then stored and/or packaged for sale and use, as per block 26 in the diagram.

In practice, various vitamin concentrates are incorporated in the mix at any stage prior to pelleting. The pellets are used extensively in feeding fowl and animals. In a typical example, the ingredients and guaranteed analysis are as follows:

*Ingredients*

Fresh condensed whey, dried skimmed milk, Vigofac, Klotogen F, D. P. P. D., methionine, manganese sulfate, oat flour, D-activated animal sterol, vitamin A palmitate, vitamin $B_{12}$ supplement.

*Guaranteed analysis*

| | | |
|---|---|---|
| Total solids, not less than | percent | 87 |
| Milk sugar, not less than | do | 39 |
| Protein, not less than | do | 14 |
| Nitrogen free extract, not less than | do | 63 |
| Lactic acid, not less than | do | 7 |
| Ash, not more than | do | 9 |
| Fiber, not more than | do | 0.81 |
| Fat, not less than | do | 0.85 |
| Vitamin A, not less than (USP units per pound) | | 2,000 |
| Vitamin C, not less than | mg./lb | 13.0 |
| Riboflavin, not less than | mg./lb | 4.17 |
| Niacin, not less than | mg./lb | 5.9 |
| Pantothenic acid, not less than | mg./lb | 6.3 |
| Choline, not less than | mg./lb | 900.90 |
| Vitamin $B_{12}$, not less than | mg./lb | .03 |
| Vitamin $D_3$, not less than (Int. chick units per pound) | | 5,000 |

We claim:

1. A method of pelleting whey which comprises mixing flour with concentrated whey to a dryness sufficient to coat sugar crystals in the whey and to render such crystals non-sticky, the forcible breaking down of the sugar crystals as thus coated by forcibly stirring the dry mix of flour and concentrated whey, and the re-moistening of the dry mix and subsequent pelleting thereof.

2. The method recited in claim 1 in which the mix comprises approximately 50 pounds of flour in proportion to approximately 72 pounds of whey solids and approximately 28 pounds of moisture.

3. The method recited in claim 2 in which the re-moistening of the stirred dry mix comprises the addition to such dry mix of an amount of liquid in a ratio approximating two quarts to one gallon of liquid for approximately 150 pounds of such dry mix.

4. The method recited in claim 1 followed by the further steps of substantially instantly drying only the exposed surfaces of the resulting pellets, and subsequently continuing more slowly the dehydration of the pellets.

5. The method recited in claim 4 in which the instant surface drying is effected during pneumatic convection of the pellets in a current of dehydrating gas and is continued only sufficiently long to preclude the pellets from sticking to each other, the pellets being thereupon exposed for the slower completion of dehydration to a dryness suitable for storage of the pellets.

6. A method of preparing a whey concentrate for food usage, the whey comprising approximately a 72% concentrate containing sugar in at least partially set up crystals, which method comprises the mixing with the whey concentrate of a sufficient quantity of flour to coat the sugar crystals and to produce a mixture too stiff for pelleting, vigorously kneading such mix, subsequently adding moisture sufficient to render the mix extrudable, and extruding the re-moistened mix.

7. The method recited in claim 6 followed by cutting the extruded mix into pellets, abruptly surface drying the pellets and more slowly continuing the dehydration of the surface dried pellets to a condition for storage.

References Cited in the file of this patent

UNITED STATES PATENTS

| | | |
|---|---|---|
| 2,126,807 | Peebles | Aug. 16, 1938 |
| 2,173,922 | Supplee | Sept. 26, 1939 |
| 2,661,295 | Frances et al. | Dec. 1, 1953 |